(12) United States Patent
Suyama

(10) Patent No.: US 10,460,595 B2
(45) Date of Patent: Oct. 29, 2019

(54) INSTRUCTION DEVICE, PROGRAM, INSTRUCTION SYSTEM, AND INSTRUCTION METHOD

(71) Applicant: YAMAHA CORPORATION, Hamamatsu-shi (JP)

(72) Inventor: Akihiko Suyama, Hamamatsu (JP)

(73) Assignee: YAMAHA CORPORATION, Hamamatsu-Shi (JP)

( * ) Notice: Subject to any disclaimer, the term of this patent is extended or adjusted under 35 U.S.C. 154(b) by 0 days.

(21) Appl. No.: 15/516,782

(22) PCT Filed: Oct. 6, 2015

(86) PCT No.: PCT/JP2015/078318
§ 371 (c)(1),
(2) Date: Apr. 4, 2017

(87) PCT Pub. No.: WO2016/056540
PCT Pub. Date: Apr. 14, 2016

(65) Prior Publication Data
US 2017/0301228 A1    Oct. 19, 2017

(30) Foreign Application Priority Data

Oct. 7, 2014   (JP) .................................. 2014-206225

(51) Int. Cl.
*G08C 17/02*    (2006.01)
*H04M 11/00*    (2006.01)
(Continued)

(52) U.S. Cl.
CPC .............. *G08C 17/02* (2013.01); *H04M 11/00* (2013.01); *H04Q 9/00* (2013.01); *G08C 2201/20* (2013.01);
(Continued)

(58) Field of Classification Search
CPC ...................................................... H04B 1/202
(Continued)

(56) References Cited

U.S. PATENT DOCUMENTS 5,646,608 A   7/1997 Shintani
9,424,738 B2  8/2016 Patel et al.
(Continued)

FOREIGN PATENT DOCUMENTS

JP     07193878 A    7/1995
JP    2003219485 A   7/2003
(Continued)

OTHER PUBLICATIONS

International Search Report issued in Intl. Appln. No. PCT/JP2015/078318 dated Dec. 22, 2015. English translation provided.
(Continued)

*Primary Examiner* — Carlos Garcia
(74) *Attorney, Agent, or Firm* — Rossi, Kimms & McDowell LLP

(57) ABSTRACT

An instruction device includes: a detection unit that detects a space in which the instruction device exists; a storage unit that stores association information including information indicating that the space and a target device are associated with each other; a specifying unit that specifies the target device associated with the detected space by referring to the association information; and an output unit that outputs an instruction signal corresponding to the specified target device in accordance with an operation by an operator.

16 Claims, 8 Drawing Sheets

(51) Int. Cl.
*H04Q 9/00* (2006.01)
*H04N 5/44* (2011.01)
*H04N 5/445* (2011.01)

(52) U.S. Cl.
CPC ..... *G08C 2201/91* (2013.01); *G08C 2201/92* (2013.01); *H04N 5/4403* (2013.01); *H04N 5/44543* (2013.01); *H04N 2005/443* (2013.01); *H04N 2005/4426* (2013.01)

(58) Field of Classification Search
USPC .............. 340/4.61, 12.22, 12.28, 539.14
See application file for complete search history.

(56) References Cited

U.S. PATENT DOCUMENTS

| | | | |
|---|---|---|---|
| 9,842,492 B2* | 12/2017 | Arling | G08C 17/02 |
| 10,009,733 B2* | 6/2018 | Babu | H04W 4/04 |
| 2002/0045424 A1* | 4/2002 | Lee | H04W 36/30 |
| | | | 455/41.2 |
| 2005/0094610 A1* | 5/2005 | de Clerq | G05B 15/02 |
| | | | 370/338 |
| 2012/0169854 A1* | 7/2012 | Seo | H04N 13/0438 |
| | | | 348/56 |
| 2013/0057395 A1 | 3/2013 | Ohashi | |
| 2014/0235265 A1 | 8/2014 | Slupik | |
| 2015/0177948 A1* | 6/2015 | Sasaki | G08C 17/00 |
| | | | 715/740 |
| 2015/0195857 A1* | 7/2015 | Pan | H04W 76/10 |
| | | | 455/41.3 |
| 2015/0358767 A1* | 12/2015 | Luna | G01S 5/0263 |
| | | | 455/456.1 |
| 2016/0301543 A1* | 10/2016 | Minezawa | G08C 17/02 |
| 2017/0163437 A1* | 6/2017 | Yang | H04L 12/2816 |

FOREIGN PATENT DOCUMENTS

| | | |
|---|---|---|
| JP | 2003284169 A | 10/2003 |
| JP | 2005354543 A | 12/2005 |
| JP | 2008206089 A | 9/2008 |
| JP | 2009239562 A | 10/2009 |
| JP | 2011066829 A | 3/2011 |
| JP | 2011066849 A | 3/2011 |
| JP | 201351593 A | 3/2013 |
| JP | 2013098897 A | 5/2013 |
| JP | 2013138279 A | 7/2013 |
| JP | 2013536627 A | 9/2013 |
| WO | 2011065028 A1 | 6/2011 |
| WO | 2012011967 A1 | 1/2012 |

OTHER PUBLICATIONS

Written Opinion issued in Intl. Appln. No. PCT/JP2015/078318 dated Dec. 22, 2015.
Extended European Search Report issued in European Application No. 15849541.6 dated May 9, 2018.
Office Action issued in Japanese Appln. No. 2014-206225 dated Jul. 17, 2018. English Translation provided.
Office Action issued in Japanese Appln. No. 2014-206225 dated Mar. 5, 2019. English machine translation provided.

* cited by examiner

| DEVICE ID | ROOM | TARGET DEVICE NAME | REMOTE CONTROL SIGNAL | |
|---|---|---|---|---|
| | | | CODE | CONTROL CONTENTS |
| ID 20 | ROOM 920 | AV RECEIVER 20 | 01011101 | POWER ON |
| ID 30 | ROOM 930 | TV 30 | 10110001 | SWITCH INPUT |
| ID 40 | ROOM 940 | LOUDSPEAKER DEVICE 40 | 00101101 | MUTE |

| DEVICE ID | ROOM | TARGET DEVICE NAME | REMOTE CONTROL SIGNAL | |
|---|---|---|---|---|
| | | | CODE | CONTROL CONTENTS |
| ID 20 | ROOM 920 | AV PLAYER 50 | 01011101 | POWER ON |

INSTRUCTION DEVICE, PROGRAM, INSTRUCTION SYSTEM, AND INSTRUCTION METHOD

TECHNICAL FIELD

The present invention relates to an instruction device for operating a target device by outputting an instruction signal to the target device.

Priority is claimed on Japanese Patent Application No. 2014-206225, filed Oct. 7, 2014, the contents of which are incorporated herein by reference.

BACKGROUND ART

Conventionally, a remote control device (instruction device) that wirelessly outputs a remote control signal (instruction signal) to a target device has been used in order to operate an electrical device (target device) disposed in a room.

Considering convenience, it is desirable to operate a plurality of target devices with only one instruction device view of the above, the remote control device described in Patent Document 1 detects the position of the own device in the room, and specifies the target device which is the output destination of the instruction signal, according to the detected position.

Specifically, Patent Document 1 describes that each of a plurality of detecting means disposed in a room outputs ultrasonic waves. The remote control device described in Patent Document 1 detects the position of its own device (remote control signal) by receiving ultrasonic waves output from a plurality of detection means.

PRIOR ART DOCUMENT

Patent Document

[Patent Document 1] Japanese Unexamined Patent Application, First Publication No. 2005-354543

SUMMARY OF THE INVENTION

Problem to be Solved by the Invention

However, in Patent Document 1, only operating a plurality of devices in the same room (space) is considered. The remote control device described in Patent Document 1 cannot detect the position of the remote control device in a space where a detection means that outputs ultrasonic waves is not arranged. Therefore, the remote control device described in Patent Document 1 cannot operate the target device arranged in the space other than the space where the detection means is arranged.

An exemplary object of the present invention is to provide an instruction device, a program, an instruction system, and an instruction method capable of operating a target device arranged in a space, in accordance with an operation by an operator.

Means for Solving the Problem

An instruction device according to an exemplary aspect of the present invention includes: a detection unit that detects a space in which the instruction device exists; a storage unit that stores association information including information indicating that the space and a target device are associated with each other; a specifying unit that specifies the target device associated with the detected space by referring to the association information; and an output unit that outputs an instruction signal corresponding to the specified target device in accordance with an operation by an operator.

A program according to an exemplary aspect of the present invention causes an instruction device to execute: detecting a space in which the instruction device exists; specifying a target device associated with the detected space by referring to the association information including information indicating that the space and the target device are associated with each other; and outputting an instruction signal corresponding to the specified target device in accordance with an operation by an operator.

An instruction system according to an exemplary aspect of the present invention includes a target device, a master device, and an instruction device that communicates with the master device. The master device includes at least one of: a detection unit that detects a space in which the instruction device exists; a storage unit that stores association information including information indicating that the space and a target device are associated with each other; a specifying unit that specifies the target device associated with the detected space by referring to the association information; and an output unit that outputs an instruction signal corresponding to the specified target device in accordance with an operation by an operator.

An instruction method according to an exemplary aspect of the present invention includes: detecting a space in which the instruction device exists; specifying a target device associated with the detected space by referring to the association information including information indicating that the space and the target device are associated with each other; and outputting an instruction signal corresponding to the specified target device in accordance with an operation by an operator.

Effect of the Invention

An instruction device, a program, and an instruction system according to an embodiment of the present invention can operate the target device by outputting an instruction signal corresponding to a target device arranged in a space, according to the operation of the operator.

EMBODIMENTS FOR CARRYING OUT THE INVENTION

Figure 1:
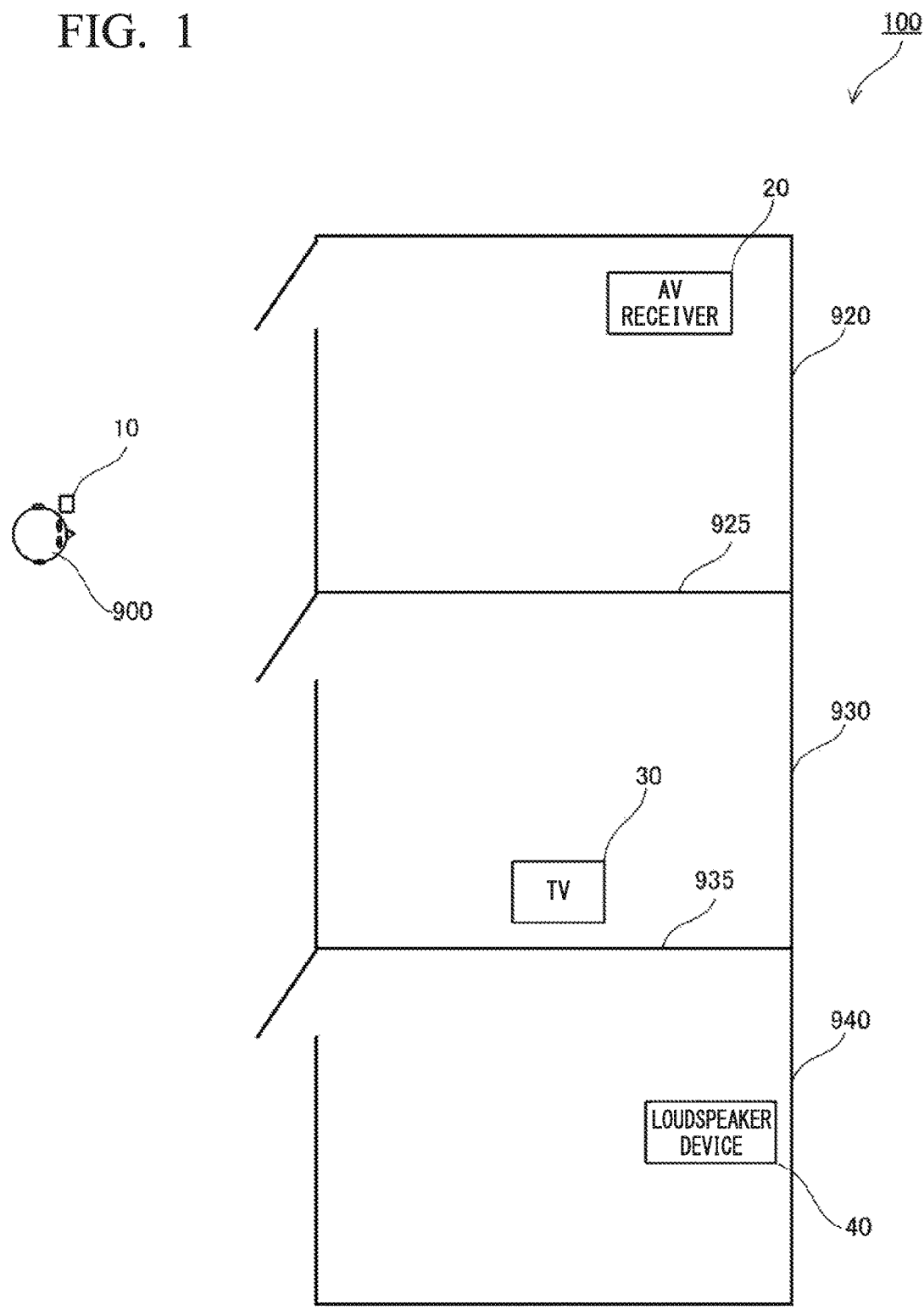
FIG. 1 is a schematic plan view for explaining the concept of an instruction system according to a first embodiment.
Figure 2A:
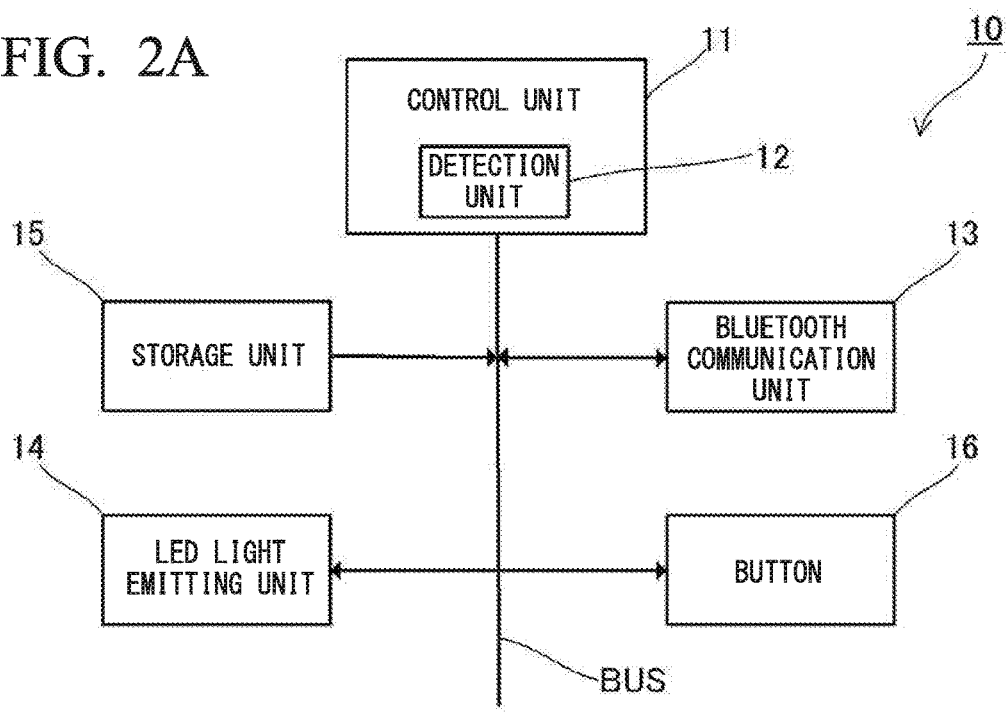
FIG. 2A is a block diagram showing a part of the configuration of an instruction device of the instruction system shown in FIG. 1.
Figure 2B:
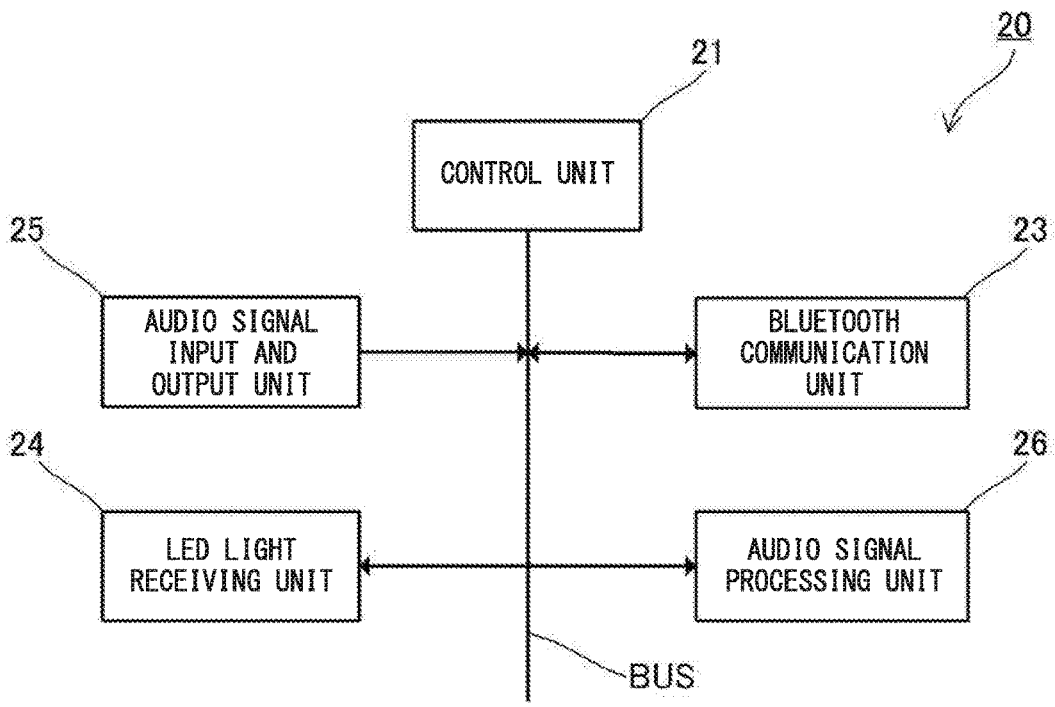
FIG. 2B is a block diagram showing a part of a configuration of an AV receiver (target device) of the instruction system shown in FIG. 1.

An instruction system 100 according to a first embodiment will be described with reference to FIG. 1, FIG. 2A, and FIG. 2B. FIG. 1 is a schematic plan view for explaining the concept of the instruction system 100. FIG. 2A is a block diagram showing a part of the configuration of an instruction device 10. FIG. 2B is a block diagram showing a part of the configuration of an AV receiver 20 (target device).

As shown in FIG. 1, the instruction system 100 includes an instruction device 10, an AV (audio visual) receiver 20, a television (sometimes referred to as TV hereinafter) 30, and a loudspeaker device 40. The AV receiver 20, the TV 30, and the loudspeaker device 40 may be examples of target devices.

In the instruction system 100, when a user 900 enters a room 920, a room 930, or a room 940 while carrying the instruction device 10, the instruction device 10 specifies the target device (the AV receiver 20, the TV 30, and the loudspeaker device 40) which is present in the room where the own device (the instruction device 10) is present. Further, the instruction device 10 outputs a remote control signal corresponding to the specified target device. Upon receiving the remote control signal from the instruction device 10, the target device performs an operation according to the remote control signal.

As shown in FIG. 1, the AV receiver 20 is arranged in the room 920. The TV 30 is arranged in the room 930. The loudspeaker device 40 is arranged in the room 940. The room 920 and the room 930 are separated by a wall 925. The room 930 and the room 940 are separated by a wall 935. However, the first embodiment is not limited to the example shown in FIG. 1. The room is not limited to 3 rooms. A plurality of target devices may be arranged in one room.

The instruction device 10 is a device carried by a user, and may be, for example, a smartphone. As shown in FIG. 2A, the instruction device 10 includes a control unit 11, a Bluetooth communication unit 13, an LED (light emitting diode) light emitting unit 14, a storage unit 15, and a button 16. These functional units are connected to a common BUS.

However, the instruction device 10 is not limited to a smartphone carried by a user, but may be a remote device or a stationary type switch which is not carried.

The control unit 11 totally controls each functional unit of the instruction device 10. The LED light emitting unit 14 includes an LED that outputs infrared rays by emitting light. Under the control of the control unit 11, the LED light emitting unit 14 blinks the LED in a pattern corresponding to a remote control signal to be transmitted. The remote control signal to be transmitted is stored in the storage unit 15, for example.

According to the control of the control unit 11, the Bluetooth communication unit 13 transmits and receives various kinds of information by transmitting and receiving radio signals conforming to the Bluetooth (registered trademark) standard.

When pressed, the button 16 outputs a signal indicating that it has been pressed, to the control unit 11. The number of the buttons 16 is not limited to one. The instruction device 10 may include a plurality of buttons 16. For example, the instruction device 10 may include an ON button an OFF button, a volume up button, and a volume down button as the buttons 16.

The control unit 11 realizes the detection unit 12 by controlling each functional unit. The detection unit 12 detects the space in which the instruction device 10 exists. Detailed operation of the detection unit 12 will be described later.

As shown in FIG. 2B, the AV receiver 20 serving as a target device includes a control unit 21, a Bluetooth communication unit 23, an LED light receiving unit 24, an audio signal input and output unit 25, and an audio signal processing unit 26.

The AV receiver 20 performs various kinds of processing (amplification of signals and sound processing, and the like) on the audio signal input to the audio signal input and output unit 25, by the audio signal processing unit 26. Further, the AV receiver 20 outputs from the audio signal input and output unit 25, audio signals that have been subjected to various kinds of processing.

The control unit 21 totally controls each functional unit of the AV receiver 20. In accordance with the control of the control unit 21, the Bluetooth communication unit 23 transmits and receives various kinds of information by transmitting and receiving radio signals conforming to the Bluetooth (registered trademark) standard.

The Bluetooth communication unit 23 periodically outputs a beacon conforming to the Bluetooth Low Energy (registered trademark) standard, to the surroundings of the AV receiver 20. This beacon includes identification information of the AV receiver 20. For example, the beacon includes the device ID (identification) of the AV receiver 20 as identification information.

The LED light receiving unit 24 includes a light receiving element that outputs an electric signal corresponding to the received infrared rays. The LED light receiving unit 24 receives the infrared rays corresponding to the remote control signal output from the instruction device 10, with its light receiving element, and thereby outputs the remote control signal to the control unit 21. The control unit 21 controls each functional unit based on the input remote control signal. For example, when a predetermined remote control signal is input, the control unit 21 turns on operations of the audio signal input and output unit 25 and the audio signal processing unit 26 (activates the audio signal input and output unit 25 and the audio signal processing unit 26).

Although not shown in the figure, the TV 30 and the loudspeaker device 40 include a control unit 21, a Bluetooth communication unit 23, and an LED light receiving unit 24, respectively, similarly to the AV receiver 20.

Figure 3:
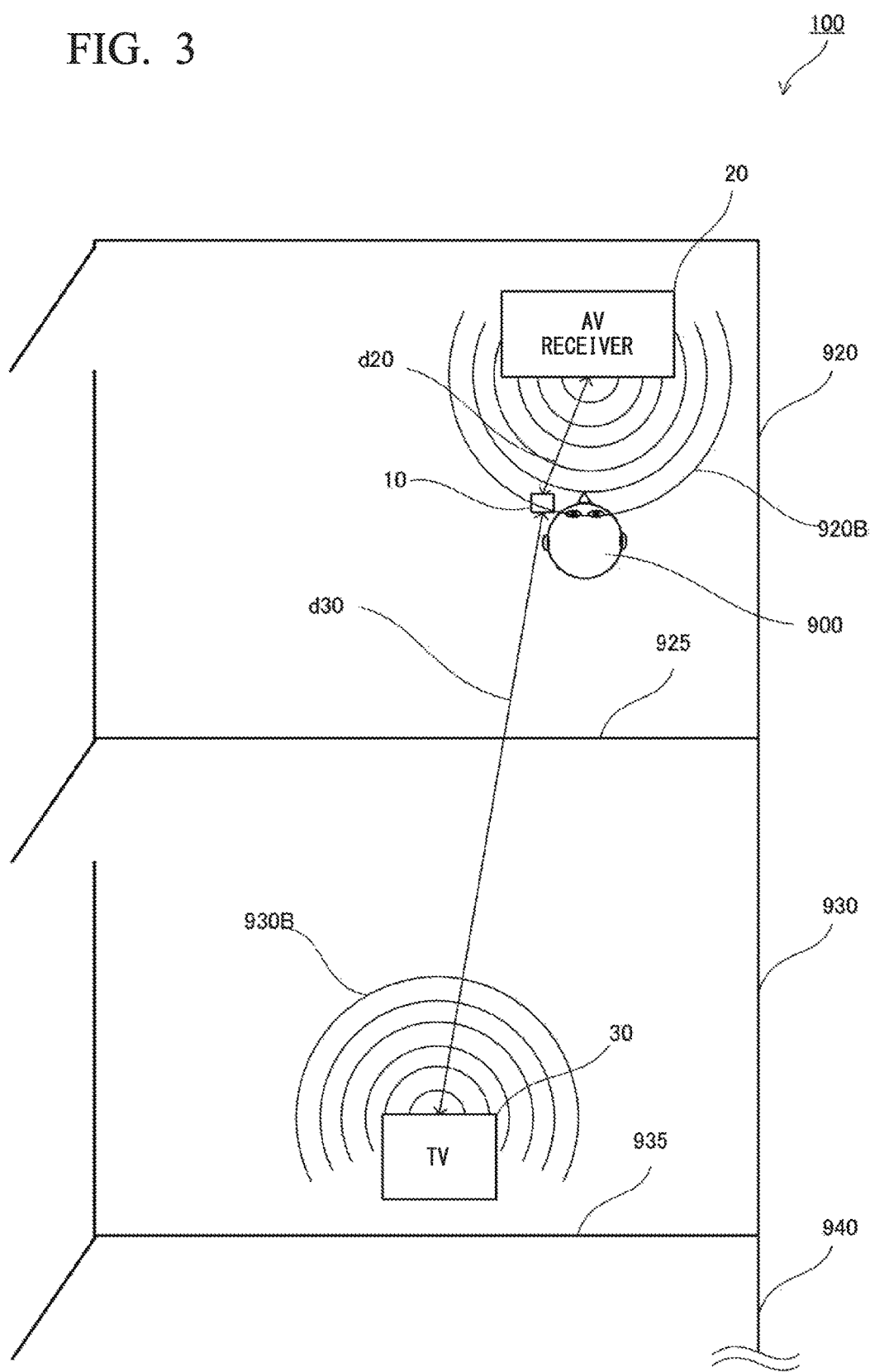
FIG. 3 is a schematic plan view of the instruction system shown in FIG. 1, for explaining an example of detection of a space in which an instruction device exists.
Figures 4, 5A, 5B:
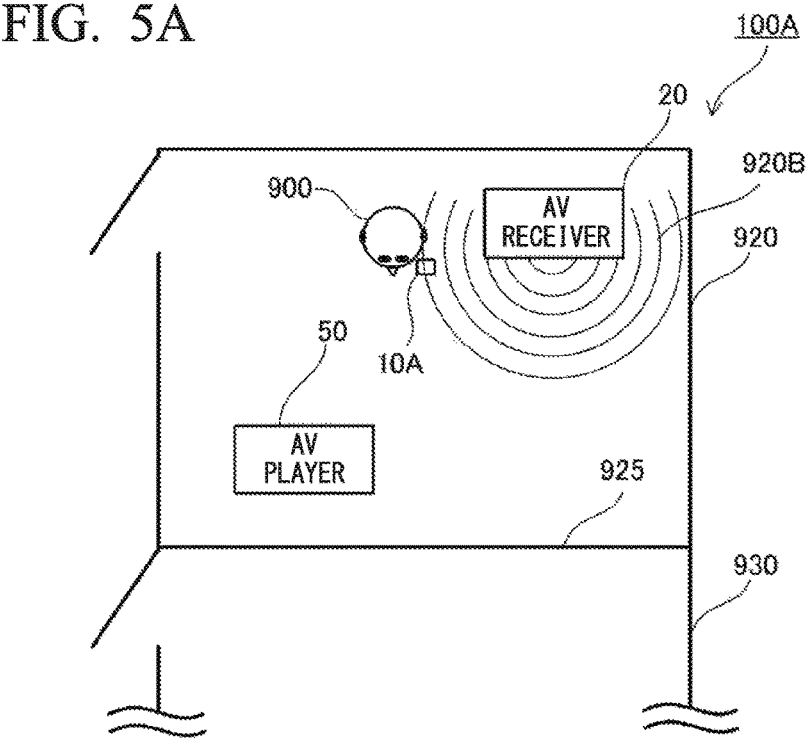
FIG. 4 is a diagram showing an example of storage contents of a storage unit of the instruction device shown in FIG. 2A.
FIG. 5A is a schematic plan view for explaining an overview of an instruction system according to a first modification example of the instruction system according to the first embodiment.
FIG. 5B is a diagram showing an example of storage contents of a storage unit in the first modification example of the instruction system according to the first embodiment.

Next, with reference to FIG. 3 and FIG. 4, the operation of the detection unit 12 realized by the control unit 11 of the instruction device 10 will be described. FIG. 3 is a schematic plan view of the instruction system 100 for explaining an example of detection of the space in which the instruction device 10 exists. FIG. 4 is a diagram showing an example of storage contents of the storage unit 15.

In the example shown in FIG. 3, the AV receiver 20 outputs a beacon 920B to the surroundings of its own device. The beacon 920B includes the device ID 20 of the AV receiver 20. The TV 30 outputs a beacon 930B to the surroundings of its own device. The beacon 930B includes the device ID 30 of the TV 30. The user 900 is located in the room 920 while carrying the instruction device 10. FIG. 3 shows the distance range of the beacon 920B and the beacon 930B shorter than the actual distance. The actual beacon 930B reaches the instruction device 10 of the room 920.

In the example shown in FIG. 3, the Bluetooth communication unit 13 of the instruction device 10 receives the beacon 920B and the beacon 930B when the button 16 is pressed, for example. As a result, the detection unit 12 of the instruction device 10 acquires the device ID 20 (identification information) of the AV receiver 20 and the device ID 30 of the TV 30.

The strength of the beacon received by the instruction device 10 depends on the distance between the instruction device 10 and the beacon source, the presence or absence of an obstacle between the instruction device 10 and the beacon source, and the like. In the example shown in FIG. 3, the distance d20 between the instruction device 10 and the AV receiver 20 is shorter than the distance d30 between the instruction device 10 and the TV 30. In the example shown in FIG. 3, the wall 925 is an obstacle to the beacon between the instruction device 10 and the TV 30. Therefore, in the instruction device 10, the strength of the beacon 920B is greater than the strength of the beacon 930B. The detection unit 12 detects the beacon with the maximum strength among the received beacons. The detection unit 12 acquires the device ID 20 as the identification information included in the beacon with the maximum strength among the received beacons.

Upon acquiring the device ID included in the beacon with the maximum strength, the detection unit 12 refers to the information in the storage unit 15 using the device ID thereof, and detects the room in which the instruction device 10 exists.

As shown in FIG. 4, the storage unit 15 stores (association information including) information indicating that the device ID, the room, the target device name, and the remote control signal are associated with each other. The remote control signal includes code and control contents.

The information indicating that the device ID and the room are associated with each other indicates the device ID detected in the room. The information indicating that the room and the target device name are associated with each other indicates the target device arranged in the room. The information indicating that the target device and the remote control signal are associated with each other indicates a remote control signal that causes the target device to operate with predetermined operation contents. The information indicating that the target device and the remote control signal are associated with each other may be stored separately from the information indicating that the device ID, the room, and the target device are associated with each other.

In the example shown in FIG. 3, when the button 16 is pressed, the instruction device 10 refers to information of the storage unit 15 (for example, information indicating that the ID 20 and the room 920 are associated with each other) by using the detected device ID 20, to thereby detect that the own device is present in the room 920. Then, the control unit 11 refers to the information of the storage unit 15 (for example, information indicating that the room 920 and the AV receiver 20 are associated with each other), and specifies that the target device disposed in the room 920 is the AV receiver 20. Further, the control unit 11 refers to the information of the storage unit 15 (for example, the information indicating that the AV receiver 20 and the remote control signal corresponding to the AV receiver 20 are associated with each other), to thereby specify the remote control signal (the code is "0101101" and the control content is powered on) corresponding to the AV receiver 20.

When specifying the target device and the remote control signal, the control unit 11 controls the LED light emitting unit 14 to output the specified remote control signal. Then, the AV receiver 20 is powered on.

Information indicating that the room 920, the AV receiver 20, and the code "01011101" and the power ON corresponding to the AV receiver 20 are associated with each other, may be an example of information indicating that the space, the target device, and the instruction signal corresponding to that target device are associated with each other. The information indicating that the room 920 and the AV receiver 20 are associated with each other may be an example of information indicating that the space and the target device are associated with each other. Information indicating that the AV receiver 20 and the remote control signal (code "01011101" and power-on) corresponding to the AV receiver 20 are associated with each other may be an example of information indicating that the target device and the instruction signal corresponding to that target device are associated with each other.

The control unit 11 may be an example of a specifying unit. A room may be an example of a space. The remote control signal may be an example of the instruction signal. The LED light emitting unit 14 may be an example of an output unit.

Similarly, when the user 900 moves to the room 940 and depresses the button 16 of the instruction device 10, which is the same as the button 16 previously operated in the room 920, the instruction device 10 acquires the device ID40 included in the beacon with the maximum strength. The instruction device 10 detects that its own device is present in the room 940 and specifies the loudspeaker device 40 arranged in the room 940 as the target device. Then, the instruction device 10 mutes the output level of the loudspeaker device 40 by outputting a remote control signal corresponding to the specified loudspeaker device 40.

In the instruction system 100, the instruction device 10 detects a room in which the own device exists, and specifies the target device arranged in the room by referring to the information in the storage unit 15 using the detection result. Therefore, in the instruction system 100 according to the present embodiment, even if the instruction device 10 moves between a plurality of rooms, by just pressing the same button 16, the instruction device 10 can specify a target device that is placed in a room where the own device exists, output a remote control signal corresponding to the target device, and can operate the target device.

The carrier of the remote control signal is not limited to infrared light and may be a radio wave compatible with Bluetooth (registered trademark) or a radio wave conforming to Wi-Fi (registered trademark). In the case where the carrier of the remote control signal is a radio wave conforming to Bluetooth (registered trademark) or Wi-Fi (registered trademark), the instruction device 10 stores the address of each target device, designates the address, and outputs a remote control signal. When the carrier of the remote control signal is a radio wave conforming to Bluetooth (registered trademark), it is possible to realize the detection of the room in which the instruction device 10 exists and the output of the remote control signal, with only one configuration (the Bluetooth communication unit 13).

In addition, when the remote control signal requires address designation of the target device example, when a remote control signal conforming to (registered trademark) is used), the storage unit 15 my store not only the information shown in FIG. 4, buy also information indicating that the device ID, the room, the target device name, and the target device address are associated with each other. In this case, the instruction device 10 outputs a remote control signal of common control content (for example, power ON) to each target device arranged in each room. As a result, the instruction device 10 can change the target device to be powered on, in accordance with the room in which the own device exists.

The storage unit 15 may store information indicating that the device ID, the room, the target device name, the address of the target device, and the remote control signal are associated with each other. In this case, depending on the room in which the instruction device 10 is present, the target device to be operated and its operation content are changed.

In the present embodiment, it is not essential that the instruction device 10 wirelessly outputs the instruction signal to the target device. For example, the instruction device 10 may output an instruction signal to a target device via a wire (e.g. USB (Universal Serial Bus) cable).

In the present embodiment,e instruction device 10 has detected the room in which the own device exists. However, the instruction device 10 is not limited to specifying in which of the plurality of rooms delimited by the wall 925 and the wall 935, the own device exists. For example, the instruction device 10 may detect in which of the spaces separated from each other (for example, the office and the home) the own device exists.

The timing of detecting the room in which the own device exists is not limited to when the button 16 is pressed. For example, the instruction device 10 may detect a room in which the own device exists by receiving a beacon at predetermined time intervals (for example, every 5 seconds), and output a remote control signal to the target device arranged in the detected room. Therefore, in the present embodiment, it is not essential that the button 16 of the instruction device 10 is pressed to detect the room.

In the above example, the instruction device 10 detects a room in which the own device exists, by receiving a beacon corresponding to the Bluetooth Low Energy standard output from a plurality of target devices. However, the instruction device 10 may detect a room in which the own device exists, by receiving another radio signal. For example, the instruction device 10 may detect a room in which the own device exists by using a GPS (Global Positioning System) signal. More specifically, the instruction device 10 may detect a room in which the own device exists, using map information (including information indicating the position) stored beforehand in the storage unit and the received GPS signal.

As another specific example, the instruction device 10 may receive a radio signal conforming to the RFID (Radio Frequency Identification) standard or the NFC (Near Field Communication) standard and having the identification information indicating the room superimposed thereon, to thereby detect a room in which the own device exists. The medium of the radio signal including the identification information is not limited to radio waves, but may be light or sound.

The signal received by the instruction device 10 is not limited to a radio signal. The instruction device 10 may detect the room in which the own device exists based on identification information acquired through a wired signal. For example, the instruction device 10 may detect a room in which the own device exists by using a cradle disposed in each room. More specifically, when the instruction device 10 is placed on a cradle, the instruction device 10 may acquire a room ID indicating a room to which the cradle is arranged, by wire from the cradle.

However, it is preferable that the instruction device 10 detects a room in which the own device exists, by receiving a radio signal. By using the radio signal, the instruction device 10 can detect a room where the own device exists, in any place in the room.

In the instruction system 100 according to the first embodiment, the target device operating based on the remote control signal, outputs the beacon. However, the first embodiment is not limited to such a configuration. The target device and the device outputting the beacon may be different.

FIG. 5A is a schematic plan view for explaining an overview of an instruction system 100A according to a first modification example of the instruction 100 according to the first embodiment. FIG. 5B is a diagram showing an example of storage contents of a storage unit 15 in the first modification example.

As shown in FIG. 5A, an AV player 50 is arranged in the room 920. The AV player 50 includes a light receiving unit that receives infrared rays. The AV player 50 performs various operations (reproduction of contents, and the like) based on a remote control signal indicated by infrared rays received by the light receiving unit.

As shown in FIG. 5A, when the instruction device 10A is located in the room 920, it receives the beacon 920B from the AV receiver 20. The instruction device 10A refers to the information in the storage unit 15 by using the device ID 20 included in the beacon 920B, in order to detect the room in which the own device exists and to specify the target device arranged in the room.

As shown in FIG. 5B, the storage unit 15 stores information indicating that the device ID 20, the room 920, and the AV player 50 are associated with each other. Therefore, in the example shown in FIG. 5A, the instruction device 10A detects that the room in which the own device exists is the room 920, and specifies that the target device arranged in the room 920 is the AV player 50.

In this manner, the instruction device 10A can also operate devices other than the device that outputs the beacon, according to the room in which the own device exists.

In the above example, one device that outputs a beacon is provided in each room. However, the instruction system may include a plurality of devices that output beacons in each room as described below.

Figure 6:
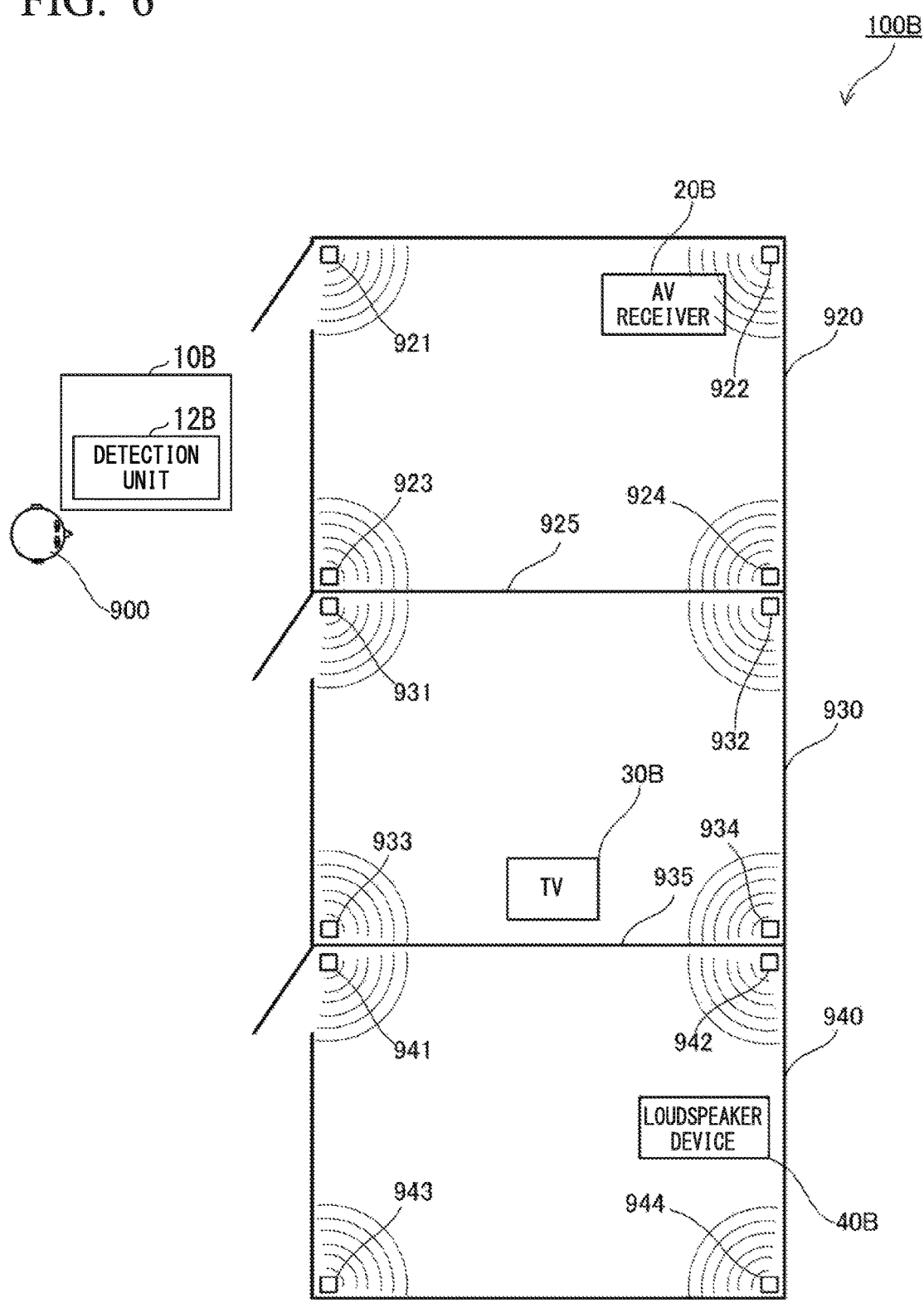
FIG. 6 is a schematic plan view of an instruction system for explaining example of detection of a space in which an instruction device exists, in the instruction system according to a second modification example of the instruction system according to the first embodiment.

FIG. 6 is a schematic plan view of an instruction system 100B according to a second modification example of the instruction system 100 according to the first embodiment.

In the instruction system 100B, an instruction device 10B detects a room in which the own device exists by receiving a beacon outputted from a plurality of transmitters. Descriptions of the configuration of the instruction system 100B overlapping with the instruction system 100 according to the first embodiment will be omitted.

The instruction system 100B includes, as target devices, an AV receiver 20B, a TV 30B, and a loudspeaker device 40B. The AV receiver 20B differs from the AV receiver 20 in that it does not output a beacon. Similarly, the TV 30B (loudspeaker device 40B) is different from the TV 30 (loudspeaker device 40) in that it does not output a beacon.

The instruction system 100B includes a plurality of transmitters in each room. In the example shown in FIG. 6, transmitters 921 to 924 are arranged at the four corners of the room 920. Transmitters 931 to 934 are arranged at the four corners of the room 930. Transmitters 941 to 944 are arranged at the four corners of the room 940.

Each of the set of transmitters 921 to 924, the set of transmitters 931 to 934, and the set of transmitters 941 to 944 outputs a beacon including the device ID of the own device at predetermined time intervals. Based on the device ID included in the beacon having the maximum strength, the instruction device 10B specifies the room in which the own device exists and the target device arranged in the room.

As described above, in the instruction system 100B, the instruction device 10B can detect the room in which the own device exists by receiving the beacon output from the plurality of transmitters, even if the target device does not output the beacon.

In the instruction systems 100, 100A, and 100B, the beacon includes the identification information (device ID) of the device that outputs the beacon. However, the present embodiment is not limited to such a configuration. The beacon may include identification information of the room in place of the identification information of the device (or together with the identification information of the device). As a specific example there is described a case where, in the instruction system 100B, each of the set of transmitters 921 to 924, the set of transmitters 931 to 934, and the set of transmitters 941 to 944 outputs a beacon which includes the room ID indicating the room in which the own device is arranged. In this case, when the Bluetooth communication unit 13 receives a plurality of beacons, the detection unit 12B of the instruction device 10B obtains the strength of each beacon. Then, the detection unit 12B groups a plurality of beacons for each room ID, and obtains the total value of the strengths of the plurality of beacons grouped for each room ID. Then, the detecting unit 12B detects that the instruction device 10B is present in the room indicated by the room ID where the total value of the strengths of the beacons is the maximum. In the case of detecting the room in which the own device exists using the total value of the strengths of the beacons, a plurality of transmitters are equally arranged in each room.

As a specific example, a case will be described where the instruction device 10B receives a beacon ID 920) with strength 10 (dB) from the transmitter 921, a beacon (room ID 920) with strength 5 from the transmitter 922, a beacon (room ID 930) with strength 2 from the transmitter 931, and a beacon (room ID 930) with strength 1 from the transmitter 932. In this example, the total value of the strengths of the plurality of beacons of the room ID 920 is 11.2 (dB) in strength. The total value of the strengths of the plurality of beacons of the room ID 930 is 4.5 (dB) in strength. Therefore, in this example, the instruction device 10B detects that its own device is present in the room 920 shown by the room ID where the total strength value is strength 15 (dB). The total value C (dB) of the two strengths (strength A (dB) and strength B (dB)) is calculated by the following equation.

$$C = 10 \times \log_{10}(10^{A/10} + 10^{B/10})$$

The detection unit 12B may simply detect that the instruction device 10B is present in the room indicated by the room ID included in the beacon which has the maximum strength, without grouping a plurality of beacons for each room ID.

When position information (for example, two-dimensional coordinates) of the transmission source is included in each beacon, the detection unit 12B may use the position information included in each beacon to detect the room in which the instruction device 10B is present. More specifically, upon receiving the beacon, the detection unit 12B determines the strength of the beacon and the position information included in the beacon. For each received beacon, the detection unit 12B associates the strength and the position formation, and temporarily stores the information. Then, the detection unit 12B finds the circumference centered on the position information for each beacon, and detects that the own device is positioned at the position where each circumference corresponding to each beacon overlaps.

The above described detection method for the space in which the instruction device exists is an example, and the instruction device may detect a space in which the own device exists by another method.

The setting of association between the room and the target device is performed, for example, by the information processing device. Specifically, the information processing device changes information indicating that the room and the target device are associated with each other shown in the example of FIG. 4. Then, the information processing device transmits the changed information to the instruction devices 10, 10A, and 10B, for example, according to the Bluetooth communication standard. The instruction devices 10, 10A, and 10B acquire the information from the information processing device via the Bluetooth communication unit 13, and update the stored contents of the storage unit 15 using the information.

The instruction devices 10, 10A, and 10B may change the information indicating that the room and the target device are associated with each other, by the own device as described below.

Figure 7:
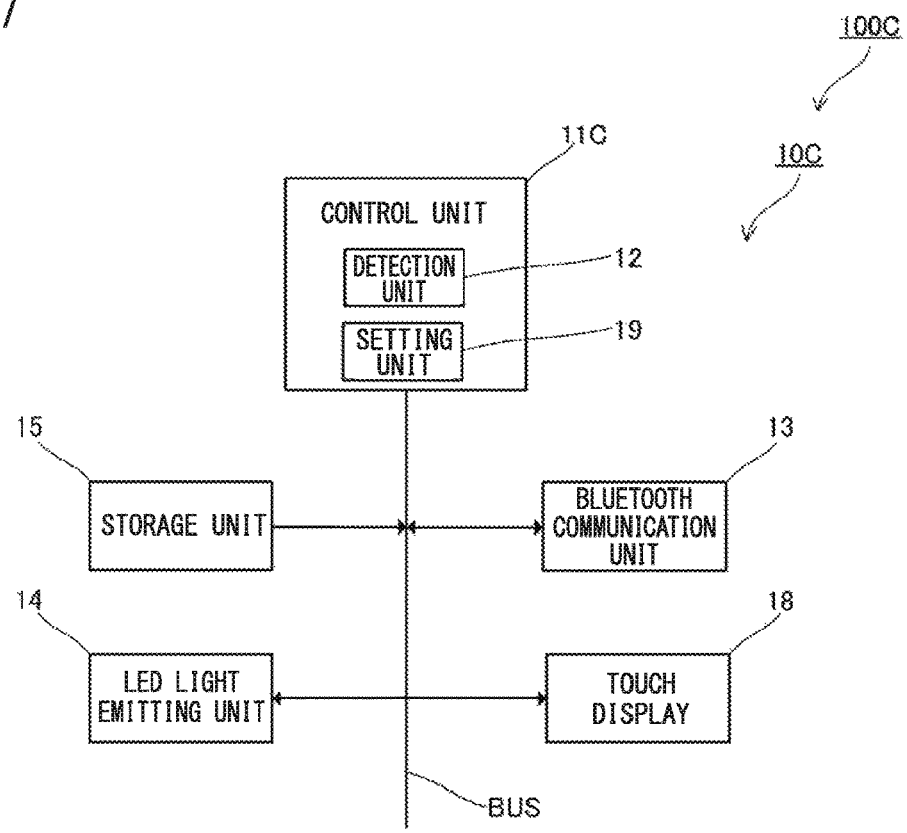
FIG. 7 is a block diagram showing a part of a configuration instruction device of an instruction system according to a second embodiment.

FIG. 7 is a block diagram showing a part of the configuration of an instruction device 10C of an instruction system 100C according to a second embodiment.

The instruction system 100C is different from the instruction system 100 according to the first embodiment from the point that the instruction device 10C implements a GUI (Graphical User interface), and the point that the operation input of the setting of the association between the room and the target device is performed on the GUI of the instruction device 10C. Descriptions of the configuration of the instruction system 100C overlapping with the instruction system 100 according to the first embodiment will be omitted.

As shown in FIG. 7, the instruction device 10C includes a touch display 18. The touch display 18 realizes acceptance of an operation input from the user 900 and display of an image.

Specifically, the touch display 18 has a structure in which a touch panel and a liquid crystal display are laminated. A control unit 11C of the instruction device 10C changes the display content of the liquid crystal display based on an operation input from the user 900 and accepted by the touch panel. Thus, the instruction device 10C realizes the GUI.

Based on the operation input accepted by the touch display 18, the control unit 11 causes the storage unit 15 to store information indicating that the room and the target device are associated with each other. As a result, a setting unit 19 that sets the association between the room and the target device is realized.

Figure 8:
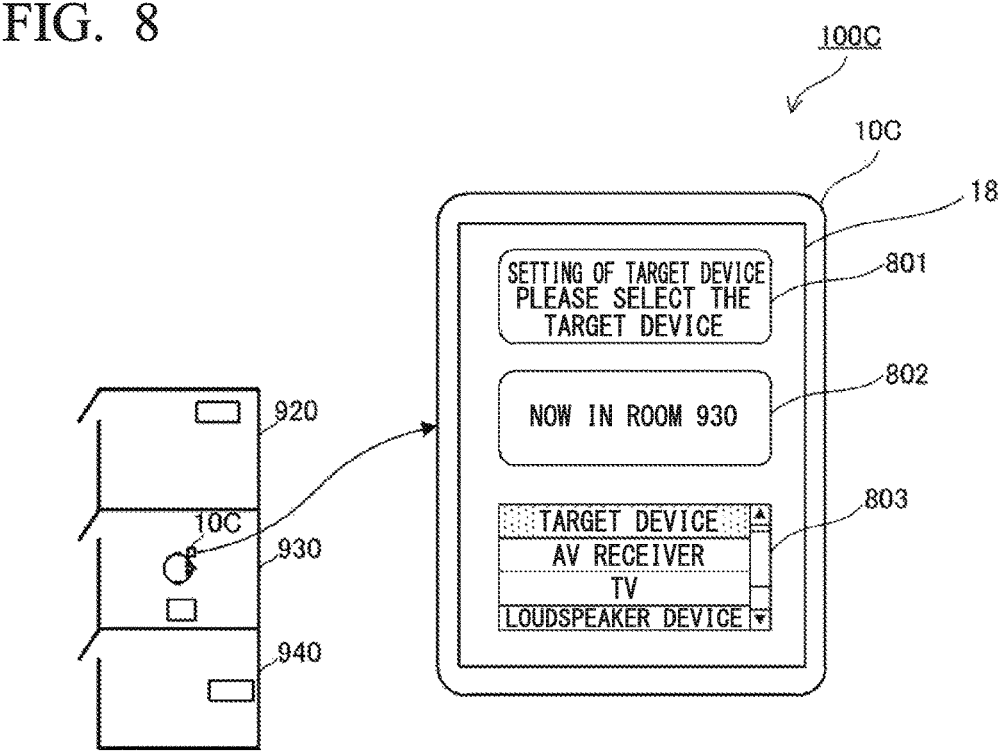
FIG. 8 is a diagram showing a display example of an instruction device at the time of setting association between a target device and a room, in the instruction system according to the second embodiment.

The operation of the instruction device 10C will be described with reference to FIG. 8. FIG. 8 is a diagram showing a display example of the instruction device 10C at the time of the setting operation for associating the target device and the room.

The touch display 18 has a region 801, a region 802, and a region 803 as display regions. As shown in the display example at the time of the setting operation in FIG. 8, the instruction device 10C displays in the area 801 a message to urge the operation of associating the room with the target device. The instruction device 10C detects the room in which the own device exists, and displays the detected room name in the area 802. The setting unit 19 sets the detected room as a target of the association processing between the room and the target device. The instruction device 10C displays a list of target device names in the area 803. The user 900 selects a target device to be associated with the room displayed in the area 802, from the plurality of target devices displayed in the area 803. The room name displayed in the area 802 and the plurality of target devices displayed in the area 803 are stored in advance in the instruction device 10C.

The setting unit 19 associates the room displayed in the area 802 with the target device selected by the user 900 in the area 803, and causes the storage unit 15 to store information indicating the association.

In the setting operation for associating the room with the target device, the instruction device 10C detects and displays the room to be subjected to the process of associating the room with the target device. Therefore, the user does not need to perform an operation of selecting a room to be subjected to the process of associating the room with the target device.

Further, in the instruction device 10C, the operation for setting to add a room as a place of use which is performed by the user, can be simplified. Specifically, when the user inputs the room name to be set, the instruction device 10C: associates the device ID included in the received beacon with the input room name, and stores these in the storage unit 15 showing the association. As a result, the user does not need to input the device ID to be associated with the inputted room name.

Each functional unit in the above-described embodiment may be realized by a program. For example, in a portable information processing device including a hardware configuration such as a processor, a memory, a Bluetooth (registered trademark) communication module, a display module having a touch panel, an LED, and the like, the processor reads the program from the memory and executes the read program. By executing the program, the information processing device executes, by using each hardware configuration, a step of detecting a space in which the information processing device exists; and a step of specifying the target device associated with the detected space by referring to the memory in the detected space, and outputting an instruction signal corresponding to the specified target device.

Figure 9A:
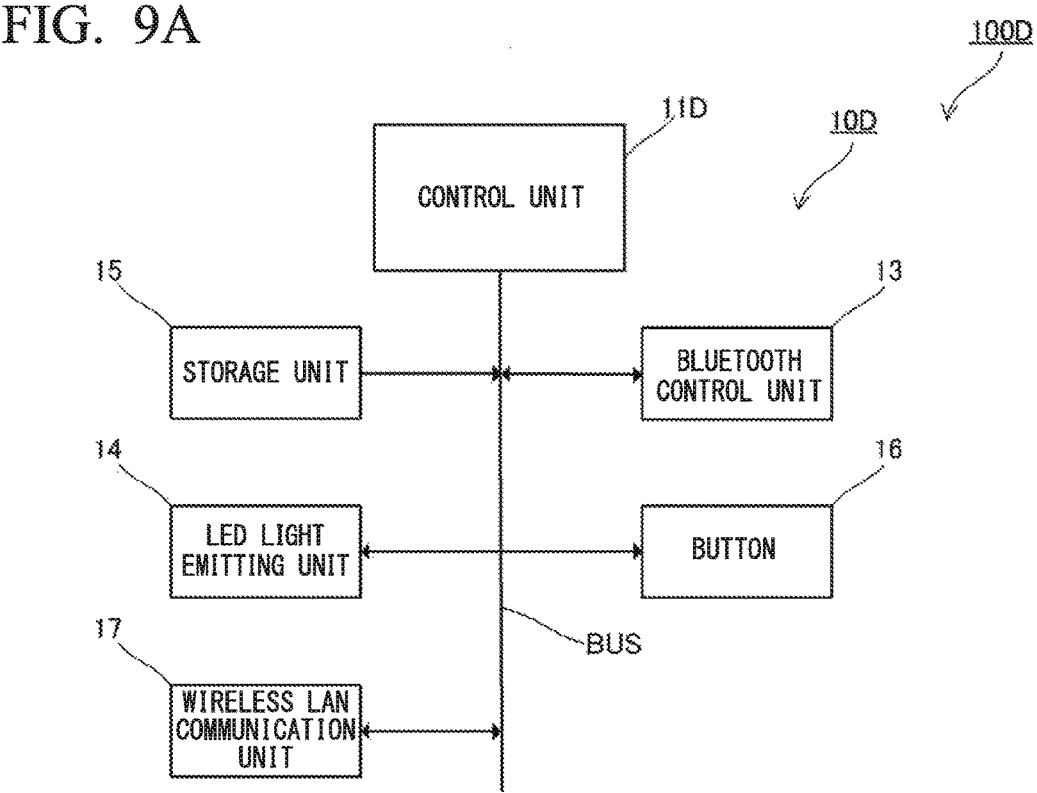
FIG. 9A is a block diagram showing a part of the configuration of an instruction device of an instruction system according to a third embodiment.
Figure 9B:
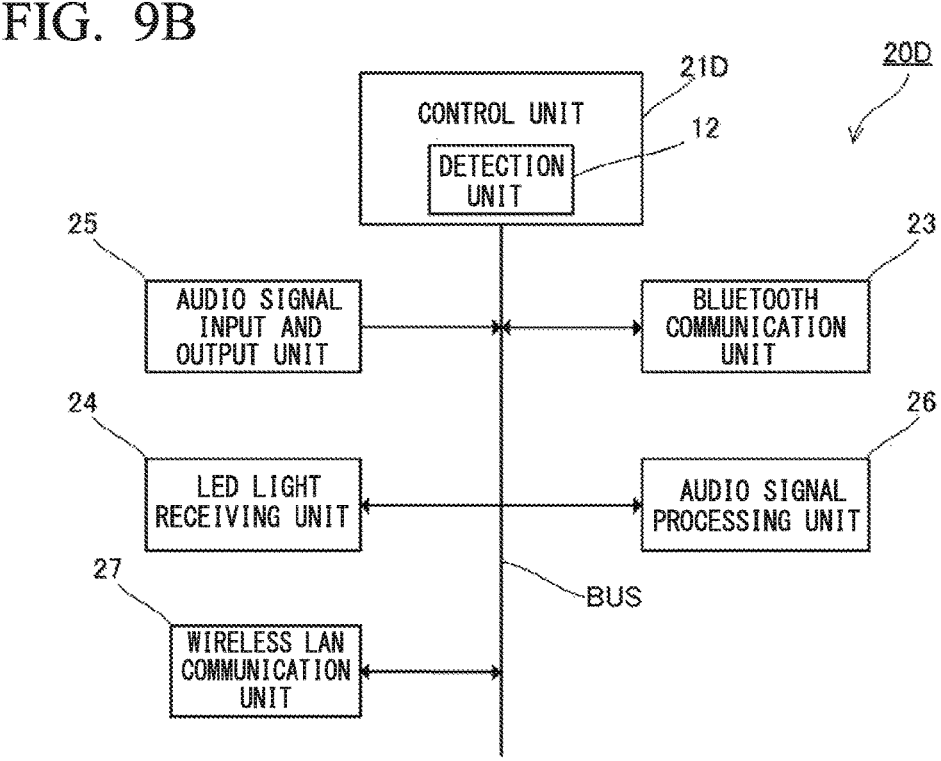
FIG. 9B is a block diagram showing of the configuration of an AV receiver (target device) of the instruction system according to the third embodiment.

Next, an instruction system 100D according to a third embodiment will be described with reference to FIGS. 9A and 9B. FIG. 9A is a block diagram showing a part of the configuration of an instruction device 10D of the instruction system 100D. FIG. 9B is a block diagram showing a part of the configuration of an AV receiver 20D.

The instruction system 100D is different from the instruction system 100 according to the first embodiment in that a detection unit 12 that detects a room in which the instruction device 10D is present is provided in the AV receiver 20D.

Specifically, as shown in FIG. 9A, the instruction device 10D includes a wireless LAN (local area network) communication unit 17. For example, the wireless LAN communication unit 17 transmits and receives various information according to the wireless LAN standard.

As shown in FIG. 9B, the AV receiver 20D includes a wireless LAN communication unit 27. The wireless LAN communication unit 27 transmits and receives various information with the same standard as that of the wireless LAN communication unit 17 of the instruction device 10D. A control unit 21D of the AV receiver 20D realizes the function of the detection unit 12 as described below.

When the button 16 is pressed, the control unit 11D of the instruction device 10D controls the wireless LAN communication unit 17 so that the device ID included in one or a plurality of beacons received by the Bluetooth communication unit 13, and the reception strength of one or a plurality of the beacons are sent to the wireless LAN communication unit 27 of the AV receiver 20D. The control unit 21D of the AV receiver 20D detects in which one of the plurality of rooms the instruction device 10D exists, based on one or more device IDs received by the wireless LAN communication unit 27 and the reception strength of the beacon. Specifically, similarly to the instruction device 10 according to the first embodiment, the instruction device 10D detects that an instruction device exists in the room indicated by the device ID included in the beacon having the maximum strength. As a result, the function of the detection unit 12 is realized in the AV receiver 20D. The detection result of the detection unit 12 is transmitted to the control unit 11D of the instruction device 10D via the wireless LAN communication unit 27 and the wireless LAN communication unit 17.

A storage unit 15 may also be provided in the AV receiver 20D. When the storage unit 15 is provided in the AV receiver 20D, the information of the remote control signal corresponding to the target device arranged in the room detected by the detection unit 12 is read out from the storage unit 15 and then transmitted to the instruction device 10D via the wireless LAN communication unit 27.

The function of the LED light emitting unit 14 may be realized by an AV receiver. That is, the function of outputting the instruction signal may be realized by an AV receiver 20E as shown in the following modified example.

Figure 10:
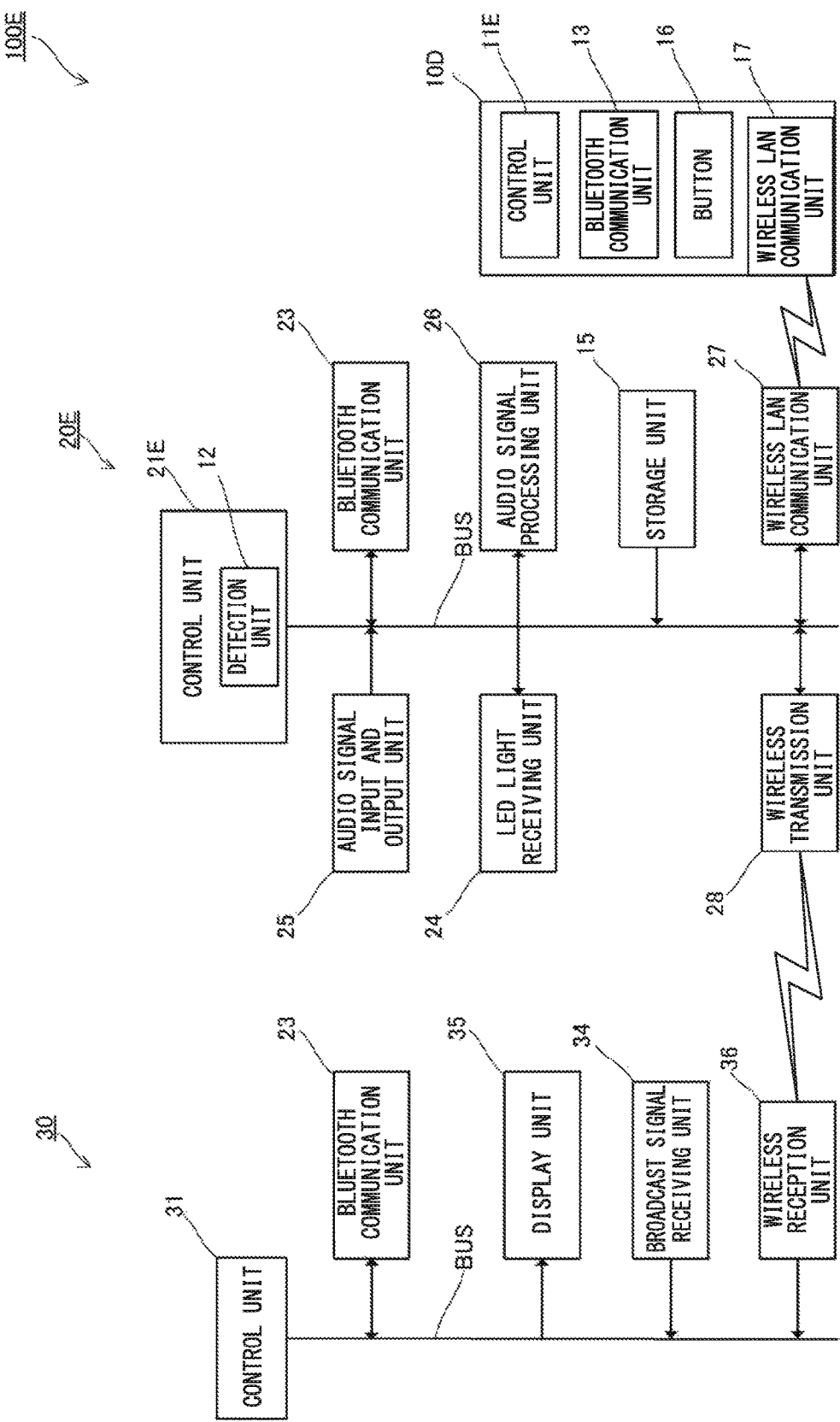
FIG. 10 is a block diagram showing a part of a configuration of an instruction system according to a modified example of the instruction system according to the third embodiment.

FIG. 10 is a block diagram showing a part of the configuration of an instruction system 100E according to a modified example of the instruction system 100D. Descriptions of the configuration of the instruction system 100E overlapping with the instruction system 100D will be omitted.

The instruction system 100E includes an AV receiver 20E. The AV receiver 20E is a master device that performs detection of a room in which the instruction device 10E is present, specification of a target device arranged in the detected room, and transmission of a remote control signal corresponding to the specified target device, and totally controls other target devices (the TV 30 and the loudspeaker device 40 (not shown in FIG. 10)).

The AV receiver 20E includes a detection unit 12, a storage unit 15, and a wireless remote control transmission unit 28. The wireless remote control transmission unit 28 may be an example of an output unit.

The wireless transmission unit (wireless remote control signal transmission unit) 28 transmits a wireless remote control signal. The TV 30 includes a wireless reception unit (wireless remote control signal reception unit) 36. The wireless reception unit 36 receives the wireless remote control signal transmitted from the wireless transmission unit 28. The control unit 31 of the TV 30, based on the remote control signal received by the wireless reception unit 36, makes a display unit 35 perform the display based on the broadcast signal received by the broadcast signal receiving unit 34.

Although not shown, the loudspeaker device 40 also includes a wireless reception unit that receives a remote control signal from the wireless transmission unit 28, similarly to the TV 30. Upon receiving the remote control signal from the wireless transmission unit 28, the loudspeaker device 40 operates (for example changes the acoustic effect) based on the received remote control signal.

In the instruction system 100E, the AV receiver 20E serves as a master device and transmits a signal compatible with the wireless remote control signal to other target devices. Therefore, even if the instruction device 10E cannot transmit a wireless remote control signal suitable for the wireless transmission portion 28, the user 900 needs only to give an instruction operation input to the instruction device 10E, so that the target device of the room in which the instruction device 10E exists, can be operated.

The AV receiver 20E as a master device, may output not only the wireless remote control signal, but also an infrared remote control signal or a remote control signal using a radio wave conforming to the Bluetooth (registered trademark) standard as a carrier.

In the instruction system 100E, the detection unit 12, the storage unit 15, and the wireless transmission unit 28 for controlling the target devices in a comprehensive manner, are provided in the AV receiver 20E which is their target device. However, the detection unit 12, the storage unit 15, and the wireless transmission unit 28 may be provided in another device that does not operate based on the remote control signal.

An instruction device according to an embodiment of the present invention includes: a detection unit that detects a space in which the instruction device exists; a storage unit that stores association information including information indicating that the space and a target device are associated with each other; a specifying unit that specifies the target device associated with the detected space by referring to the association information; and an output unit that outputs an instruction signal corresponding to the specified target device in accordance with an operation by an operator.

In the instruction device according to the embodiment of the present invention, the output unit may be one that outputs an instruction signal wirelessly (for example, a remote control device), or one that outputs an instruction signal by wire pie, a switch that turns the lighting device on or off).

The association information stored in the storage unit indicates which target device is arranged in each of the plurality of spaces.

The instruction device according to the embodiment of the present invention detects in which space the own device (instruction device) exists, and specifies the target device arranged in the space where the instruction device exists. Therefore, by using one instruction device, an instruction signal corresponding to the target device can be outputted to the target device arranged in an arbitrary space among the plurality of spaces, and the target device can be operated.

The instruction device may further include a reception unit that receives an operation input of the instruction, and the output unit may output the instruction signal only then the reception unit receives the operation input. As a result, the user can cause the instruction device to output the instruction signal to the instruction device only when it is intended, by performing the operation.

The detection unit may for example, receive a GPS (Global Positioning System) signal, and detect the space where the instruction device exists by using map information (including information indicating the position of the room) and position information shown in the GPS signal. Instead of using the GPS signal, the detection unit may detect the space where the instruction device exists as follows.

The detection unit receives a radio signal propagating through the space. The radio signal includes identification information indicating a transmission source of the radio signal. The association information includes information indicating that the space and the identification information are associated with each other. The detection unit detects the space associated with the identification information included in the received radio signal as the space in which the instruction device exists, by referring to the association information.

The radio signal propagating through the space may be, for example, a signal conforming to RFID (Radio Frequency Identification) standard or NFC (Near Field Communication) standard. Further, the radio signal propagating through the space may be a beacon (for example, a signal conforming to the Bluetooth (registered trademark) Low Energy standard) outputted at predetermined time intervals. Furthermore, the radio signal propagating through the space is not limited to radio waves, and may be sound, light, or the like. For example, the detection unit receives the sound in which identification information is modulated, demodulates the sound, and extracts the identification information.

The transmission source of the radio signal may be, for example, a target device or a device other than a target device.

The radio signal may include a plurality of radio signals. The detection unit may obtain strength of each of the plurality of radio signals, detect a radio signal having maximum strength among the plurality of radio signals, and detect the space associated with identification information included in the radio signal having the maximum strength, as the space where the instruction device exists, by referring to the association information.

Thus, even if a plurality of radio signals are received, the detection unit narrows down to one radio signal having the maximum strength, so that it is possible to narrow down the space in which the own device (instruction device) exists into one. However, the detection unit need not detect only one radio signal, but may detect the space where the instruction device exists using each strength of the plurality of radio signals.

The instruction device according to the embodiment of the present invention may further include: a reception unit that receives an operation input indicating selection of any one of a plurality of target devices; and a setting unit that causes the storage unit to store information indicating that a space detected by the detection unit and the target device indicated by the operation input are associated with each other.

Since the instruction device detects the space where the own device (the instruction device) exists, at the time of setting association between the plurality of spaces and the plurality of target devices, a situation where the space to be set is selected by the user can be omitted.

The embodiment of the present invention is not limited to the instruction device, but may be a program executed by the instruction device.

The embodiment of the present invention is not limited to the instruction device, but may be an instruction system including a target device, a master device, and an instruction device that communicates with the master device. In this case, the master device includes at least one of the detection unit, the storage unit, the specifying unit, and the output unit. Further, the master device may be a target device that operates based on the instruction signal.

Processing may be performed by recording a program for executing the functions of each of the devices according to the above described embodiments (for example, the instruction devices 10, 10A, 10B, 10C, 10D, 10E, AV receivers 20, 20B, 20C, 20D, 20E, and the instruction systems 100, 100A, 100B, 100C, 100D, 100E), on a computer-readable recording medium, and reading the program recorded on the recording medium into a computer system and then executing.

The "computer system" referred to here may include hardware such as an operating system (OS) and peripheral devices.

The "computer-readable recording medium" includes a writable nonvolatile memory such as a flexible disk, a magneto-optical disk, a ROM (Read Only Memory), and a flash memory, a portable medium such as a DVD (Digital Versatile Disk), and a storage device such as a hard disk built into a computer system.

"Computer-readable recording medium" also includes those holding programs for a certain period of time such as a volatile memory (for example, a DRAM (Dynamic Random Access Memory)) inside a computer system serving as a server or a client when a program is transmitted via a network such as the Internet or a communication line such as a telephone line.

The above program may be transmitted from a computer system in which the program is stored in a storage device or the like to another computer system via a transmission medium or by transmitted waves in a transmission medium. A "transmission medium" for transmitting a program refers to a medium having a function of transmitting information such as a network (communication network) such as the Internet and a communication line (communication line) such as a telephone line.

The above program may be for realizing part of the above-described functions.

The above-described program may be a so-called difference file (difference program) which can realize the above-described functions by combination with a program already recorded in the computer system.

INDUSTRIAL APPLICABILITY

The present invention may be applied to an instruction device, a program, an instruction system, and an instruction method.

REFERENCE SYMBOLS

10, 10A, 10B, 10C, 10D, 10E Instruction devices
11, 11C, 11D Control unit
12, 12B Detection unit
13 Bluetooth communication unit
14 LED light emitting unit
15 Storage unit
16 Button
17 Wireless LAN communication unit
18 Touch display
19 Setting unit
20, 20B, 20C, 20D, 20E AV receiver
21, 21D Control unit
23 Bluetooth communication unit
24 LED light receiving unit
25 Audio signal input and output unit
26 Audio signal processing unit
27 Wireless LAN communication unit
28 Wireless transmission unit
30, 30B Television
31 Control unit
34 Broadcast signal receiving unit
35 Display unit
36 Wireless reception unit
40, 40B Loudspeaker device
50 AV player
100 Instruction system
100, 100A, 100B, 100C, 100D, 100E Instruction system
921 to 924, 931 to 934, 941 to 944 Transmitter

The invention claimed is:

1. An instruction system comprising a master device and an instruction device that communicates with the master device,
the instruction device comprising:
   a first communication unit that receives a beacon outputted from a target device and a device ID included in the beacon outputted from the target device, by using a first communication means; and
   a second communication unit that sends the received device ID and a reception strength of the beacon outputted from the target device, by using a second communication means different from the first communication means, and
the master device comprising:
   a controller;
   a communication unit that receives the device ID and the reception strength of the beacon from the instruction device, by using another second communication means;
   a detection unit that detects, based on the received device ID and the reception strength of the beacon, a space in which the instruction device is located in together with the target device;
   a storage that stores association information including information indicating that the detected space in which the instruction device is located in and the target device are associated with each other;
   a specifying unit that specifies the target device associated with the detected space in which the instruction device is located in by referring to the association information; and
   a signal outputter that outputs an instruction signal corresponding to the specified target device in accordance with an operation by an operator,
   wherein the detection unit and specifying unit are implemented by the controller, and
   wherein the communication unit of the master device receives a plurality of device IDs and reception strengths respectively associated with a plurality of beacons, the detection unit detects the space based on a device ID included in a beacon among the plurality of beacons having a maximum reception strength, and the specifying unit specifies a device by referring to the detected device ID and the associated information stored in the storage.

2. The instruction system according to claim 1, wherein the space is a first space, and the target device is a first target device, and
the association information includes first information indicating that the first space and the first target device are associated with each other, and second information indicating that a second space different from the first space and a second target device different from the first target device are associated with each other.

3. The instruction system according to claim 1, wherein the master device operates based on an instruction signal from the instruction device.

4. The instruction system according to claim 1, wherein the detection unit receives first information including a first device ID and a first reception strength of a beacon outputted from a first device located in a first room and second information including a second device ID and a second reception strength of a beacon outputted from another device located in a second room different from the first room, and based on the received first information and second information, detects that the instruction device is located in either the first room together with the first device located in the first room or the second room together with the another device located in the second room.

5. The instruction system according to claim 1, wherein the communication unit of the master device sends information of the specified target device to the instruction device, by using the another second communication means.

6. The instruction system according to claim 1, wherein the space and the target device are associated with each other in the association information, and the association information further includes information identifying a remote control signal that causes the target device to operate with predetermined operation contents.

7. The instruction system according to claim 1, wherein the target device operates in accordance with an instruction from the instruction device by receiving a signal sent from the master device by using the another second communication means.

8. The instruction system according to claim 1, wherein the master device is an audio device that performs amplification and sound processing on an input audio signal, and the target device is a loudspeaker device that is controlled by the audio device.

9. A method executed by a master device and an instruction device that communicates with the master device, the method comprising:
receiving, by the instruction device, a beacon outputted from a target device and a device ID included in the beacon outputted from the target device, by using a first communication means;
sending, by the instruction device, the received device ID and a reception strength of the beacon outputted from the target device, by using a second communication means different from the first communication means;
receiving, by the master device, information from the instruction device, by using the second communication means;
receiving, by the master device, the device ID and the reception strength of the beacon from the instruction device;
detecting, by the master device, based on the received device ID and the reception strength of the beacon, a space in which the instruction device is located in together with the target device;
storing, in the master device, association information including information indicating that the detected space in which the instruction device is located in and the target device are associated with each other;
specifying, by the master device, the target device associated with the detected space in which the instruction device is located in by referring to the association information; and
outputting, by the master device, an instruction signal corresponding to the specified target device in accordance with an operation by an operator,
wherein a plurality of device IDs and reception strengths respectively associated with a plurality of beacons are received by the master device, the space is detected based on a device ID included in a beacon among the plurality of beacons having a maximum reception strength, and a device is specified by referring to the detected device ID and the associated information stored in the master device.

10. The method according to claim 9, wherein information of the specified target device is sent from the master device to the instruction device, by using the another second communication means.

11. The method according to claim 9, wherein the space and the target device are associated with each other in the association information, and the association information further includes information identifying a remote control signal that causes the target device to operate with predetermined operation contents.

12. The method according to claim 9, wherein the target device is operated in accordance with an instruction from the instruction device by receiving a signal sent from the master device by using the another second communication means.

13. The method according to claim 9, wherein the master device is an audio device that performs amplification and sound processing on an input audio signal, and the target device is a loudspeaker device that is controlled by the audio device.

14. The method according to claim 9,
wherein the space is a first space, and the target device is a first target device, and
the association information includes first information indicating that the first space and the first target device are associated with each other, and second information indicating that a second space different from the first space and a second target device different from the first target device are associated with each other.

15. The method according to claim 9, wherein the master device is operated based on an instruction signal from the instruction device.

16. The method according to claim 9, wherein first information including a first device ID and a first reception strength of a beacon outputted from a first device located in a first room is received, and second information including a second device ID and a second reception strength of a beacon outputted from another device located in a second room different from the first room is received, and based on the received first information and second information, it is detected that the instruction device is located in either the first room together with the first device located in the first room or the second room together with the another device located in the second room.

* * * * *